United States Patent [19]

Youn

[11] Patent Number: 5,107,401
[45] Date of Patent: Apr. 21, 1992

[54] LAP TOP COMPUTER WITH TILTING MECHANISM CONSISTING OF A BATTERY PACK PIVOTALLY ATTACHED ON A REAR SURFACE

[75] Inventor: Jaesam Youn, Ahnyang, Rep. of Korea

[73] Assignee: Samsung Electronics Co., Ltd., Rep. of Korea

[21] Appl. No.: 626,281

[22] Filed: Dec. 12, 1990

[30] Foreign Application Priority Data

Jul. 11, 1990 [KR] Rep. of Korea ............... 90-10169

[51] Int. Cl.⁵ ................. H05K 5/00; G06F 1/00; B41J 29/06; E05D 11/06
[52] U.S. Cl. ................. 361/393; 364/708; 400/681; 248/677; 16/357; 429/100
[58] Field of Search ............... 400/680, 681, 682; 361/380, 392, 393, 394, 395, 399; 248/676, 677; 16/357, 360, 362, 374; 429/97, 100; 364/708

[56] References Cited

U.S. PATENT DOCUMENTS

| | | | |
|---|---|---|---|
| 311,439 | 1/1885 | Michelson | 16/357 |
| 4,683,614 | 8/1987 | Anderson | 16/362 |
| 4,742,478 | 5/1988 | Nigro, Jr. et al. | 361/394 X |
| 4,951,241 | 8/1990 | Hosoi et al. | 364/708 |
| 5,019,465 | 5/1991 | Herron et al. | 429/97 |

FOREIGN PATENT DOCUMENTS 520309 4/1940 United Kingdom ............... 16/357

Primary Examiner—Leo P. Picard
Assistant Examiner—Michael W. Phillips
Attorney, Agent, or Firm—Cushman, Darby & Cushman

[57] ABSTRACT

A lap top computer with a tilting mechanism attached is disclosed, and a battery pack is used for inclinedly supporting the computer body. The mechanism for connecting the computer body to the battery pack includes a pair of first guide members, a pair of second guide members, and a hinge. Each first guide member is provided with a guide slot, and the guide slot is formed in an elongate and arcuate shape concentrically around the shaft of the hinge. Each first guide member is further constituted such that one end thereof is fixedly installed within the rear portion of the computer body, and the other end thereof is projected through a hole of the rear portion of the computer body to the outside. One end of each second guide member is provided with a protuberance for being inserted into the guide slot of the first guide member, and the other end of each second guide member is fixedly installed within the battery pack.

4 Claims, 3 Drawing Sheets

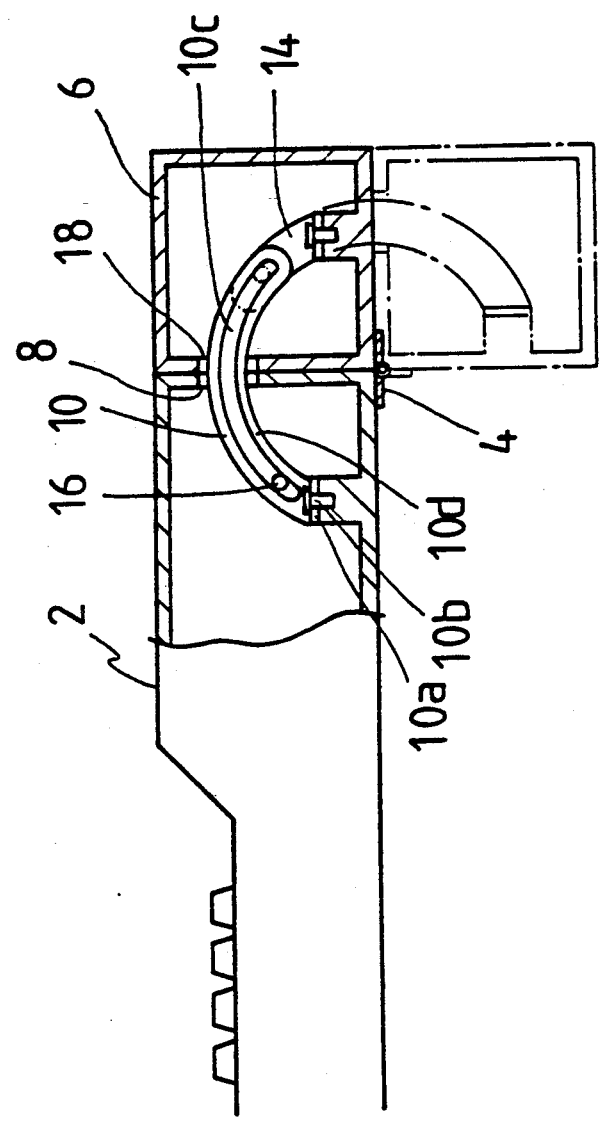

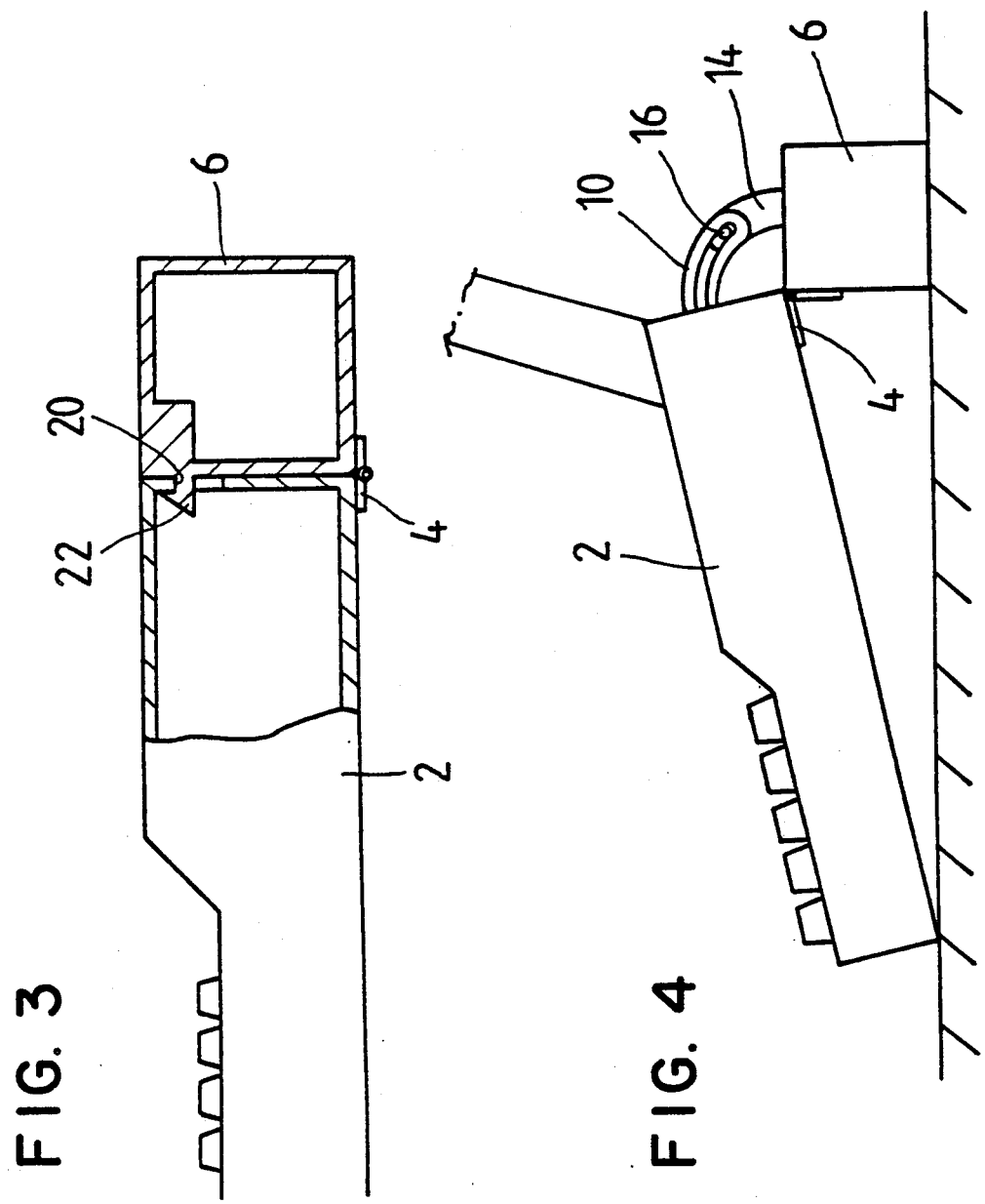

LAP TOP COMPUTER WITH TILTING MECHANISM CONSISTING OF A BATTERY PACK PIVOTALLY ATTACHED ON A REAR SURFACE

BACKGROUND OF THE INVENTION

1. Field of the Invention

The present invention relates to a lap top computer with a tilting mechanism attached, and particularly to a lap top computer in which the key board can be properly tilted during the use by making the battery pack foldable, thereby providing a convenience in use.

2. Description of the Prior Art

As has been well known, a lap top computer can be carried with, and recordings can be made into the memory of it at different places. In this lap top computer, the key board and the main body are integrally formed together, and an LCD (Liquid Crystal Display) monitor is attached to the back of the main body by means of a hinge. Such a lap top computer is used indoors or outdoors, and therefore, usually a battery is installed within it.

In the case where a separate desk is not provided, a lap top computer is used mounted on the lap of the user. Therefore, the lap top computer is used in such a state that the key board is positioned in a horizontal posture, or the monitor is downwardly inclined. Accordingly, during the use of the lap top computer, the user has to experience an inconvenience in his posture, with the result that typhographical errors are committed in many cases.

Conventionally, in order to provide a solution to such a problem, a supporting member is fixedly attached on the bottom of the computer body, in such a manner that the rear portion of the key board is raised up. However, such a device renders the computer inconvenient to carry because the supporting member is attached on the bottom of the computer all the time. Further, in case that the floor of the place where the computer is to be used is inclined, the supporting member is as an impediment.

Recently, in order to overcome such a problem, the supporting member is formed in a foldable form so that the supporting member can be folded according to need. However, this requires additional components, and therefore, the manufacturing cost is increased.

SUMMARY OF THE INVENTION

The present invention is intended to overcome the disadvantages of conventional techniques.

Therefore, it is the object of the present invention to provide a lap top computer with a tilting mechanism attached, in which a battery pack is attached to the back of the computer in a foldable form so that it can be used when needed, thereby providing a convenience to carrying and using the computer.

In achieving the object, the tilting mechanism for the lap top computer according to the present invention includes: a pair of first guide members respectively provided with a guide slot, with one end of said first guide member fixedly installed within the rear portion of the computer body, and with the other end thereof projected through a hole of the rear portion of the computer body to the outside; a pair of second guide members respectively provided with a protuberance on one end thereof so that the protuberance can be inserted into the guide slot of said first guide member, with the other end of said second guide member being fixedly installed within a battery pack; and a hinge for pivotally connecting said computer body and said battery pack.

Further, an engaging hole is formed on the rear plate of the computer body, and an engaging protuberance is formed on the opposingly facing side of the battery pack, so that the battery pack can maintain a fixed state during the carrying. The guide slot is formed in an elongated and arcuate form concentrically around the hinge shaft, and the thickness of the first and second guide members should desirably be less than half the width of the guide slot. When the battery pack is used as a supporting member, the inclination of the computer body should be desirably 5°–15°.

BRIEF DESCRIPTION OF THE DRAWINGS

The above object and other advantages of the present invention will become more apparent by describing in detail the preferred embodiment of the present invention with reference to the attached drawings in which:

FIG. 2 is a side sectional view of the coupled state of the critical portion of the present invention;

FIG. 3 is a partial side sectional view showing the engaging state of the battery pack during the non-use of the lap top computer of the present invention; and FIG. 4 illustrates a using state of the lap top computer according to the present invention.

DESCRIPTION OF THE PREFERRED EMBODIMENT

Figure 1:
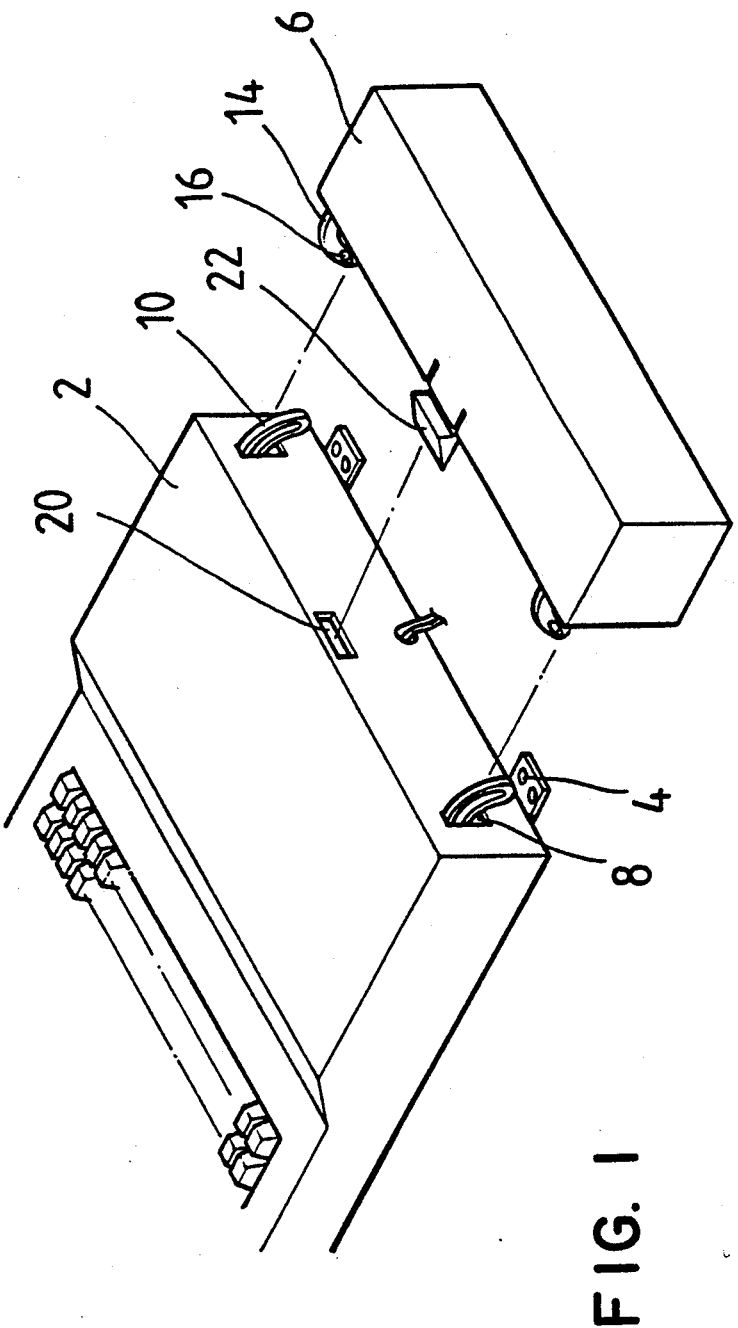
FIG. 1 is an exploded perspective view of the lap top computer on which the mechanism of the present invention is constructed.

Referring to FIG. 1, only the rear portion of a computer body 2 is illustrated, and the illustration of an LCD panel is omitted, these portions being same as the usual lap top computers. A hinge 4 is installed at a lower position of the rear plate of the computer body 2, in such a manner that the computer body 2 is connected to a battery pack 6.

A pair of holes 8 are formed on the computer body 2, and a pair of first guide members 10 are projected through the holes 8, respectively. As shown in FIG. 2, the first guide member 10 includes a securing portion 10a, a fastening hole 10b formed on the securing portion 10a, a guide portion 10d, and a guide slot 10c formed on the guide portion 10d.

Each of the guide members 10 is attached to the inside of the computer body 2 by fastening a bolt through the fastening hole 10b of the securing portion 10a. The guide slot 10c is formed in an elongated and arcuate shape concentrically around the hinge 4.

The width of the hole 8 through which the first guide member 10 passes should be larger than the thickness of the first guide member 10, so that a second guide member (to be described later) can be accommodated together within the hole 8 in a smoothly movable manner.

Meanwhile, on the battery pack 6, there is installed a second guide member 14 which is coupled with the first guide member 10 in the form of a facial contact.

The second guide members 14 take the same shape as that of the first guide members, and each of the second guide members 14 is fixedly installed on the inside of the battery pack 6 in the same manner as that of the first guide members 10, one end of each said second guide member being projected to the outside. A protuberance 16 protrudes at the leading end of the second guide member 14 in a direction rectangularly crossing the second guide member 14, and this protuberance 16 is to be inserted into the guide slot 10c in a slidable manner. As can be seen by referring to FIG. 2, while the first guide member 10 is projected through the hole 8 to the outside, the second guide member 14 is projected through the hole 18 of the battery pack 6 to the outside.

The first and second guide members 10, 14 are installed, being separated by as much as their thickness, and the first guide member 10 is inserted through the hole 18 into the battery pack 6, while the second guide member 14 is inserted through the hole 8 into the computer body 2. Further, an engaging hole 20 is formed on the rear plate of the computer body 2, while on the battery pack 6, there is formed an engaging protuberance 22 which is to be secured after passing through the engaging hole 20. The engaging protuberance 22 which is extended from the battery pack 6 is notched so as to allow the engaging protuberance 22 to deflect elastically.

In such a lap top computer constituted as described above, if the engaging protuberance 22 of the battery pack 6 is inserted into the engaging hole 20 of the computer body 2, then the engaging protuberance 22 passes through the engaging hole 20 in a state slightly inclined downwardly, and then, the engaging protuberance 22 is restored to the original posture owing to its own elasticity, with the result that the engaging protuberance 22 is engaged with the edge of the one end of the engaging hole 20.

That is, the lap top computer becomes suitable for carrying. In this state, if the computer is to be used, the engaging protuberance 22 is pressed down from the above, and at the same time, the battery pack 6 is pulled out, so that the engaging protuberance 22 should come out from the engaging hole 20. Thus, after the releasing of the engaging protuberance 22, if the battery pack 6 is pushed downwardly, the battery pack 6 is pivoted around the hinge 6. Under this condition, the protuberance 16 of the second guide member 14 is slid through the elongate guide slot 10c of the first guide member 10, and because the guide slot 10c is formed in an arcuate shape around the hinge 4, the battery pack 6 is smoothly pivoted.

Thus, after such a pivoting, as shown in FIG. 4 the computer body 2 maintains an inclination of about 5°-15° at the using place. Thus, the base of the computer body may be disposed in one of first and second positions relative to a plane depending upon retraction or extension of said battery pack. The inclination of the computer body 2 depends on the size of the battery pack 6.

According to the present invention as described above, a battery pack is connected to the computer body through a hinge, and therefore, the battery pack can be pivoted to such a state that the battery pack should serve as a convenient supporting member.

What is claimed is:

1. A lap top computer including a computer body with a rear plate with a tilting mechanism attached thereto, said tilting mechanism comprising: a pair of first guide members respectively provided with a guide slot, with one end of each said first guide members attached to the rear portion of the computer body, and with each of the other ends thereof projecting through holes in the rear portion of the computer body to the outside; a pair of second guide members respectively provided with a protuberance on one end thereof, said protuberance slideably engaged in said guide slot of each said side first guide members, with the other end of each said second guide members, being attached to a battery pack; and a hinge including a shaft pivotally connecting the computer body to said battery pack.

2. The lap top computer with a tilting mechanism attached as claimed in claim 1, wherein said rear plate includes an engaging hole, and said battery pack includes an engaging protuberance for engagement with said engaging hole.

3. The lap top computer with a tilting mechanism attached as claimed in claim 1, wherein said guide slot comprises an elongated and arcuate shape disposed concentrically around the shaft of said hinge.

4. The lap top computer with a tilting mechanism attached as claimed in claim 1, wherein the computer body is disposed in one of first and second positions relative to a plane upon retraction and extension of said battery pack, said second position being inclined approximately 5°-15° from said first position.

* * * * *